United States Patent
Ashikhmin et al.

(10) Patent No.: US 9,667,450 B2
(45) Date of Patent: May 30, 2017

(54) DETECTION AND CORRECTION OF IMPULSE NOISE IN COMMUNICATION CHANNEL CROSSTALK ESTIMATES

(75) Inventors: Alexei E. Ashikhmin, Morristown, NJ (US); Philip Alfred Whiting, New Providence, NJ (US)

(73) Assignee: Alcatel Lucent, Boulogne-Billancourt (FR)

( * ) Notice: Subject to any disclaimer, the term of this patent is extended or adjusted under 35 U.S.C. 154(b) by 891 days.

(21) Appl. No.: 12/915,743

(22) Filed: Oct. 29, 2010

(65) Prior Publication Data

US 2012/0106605 A1    May 3, 2012

(51) Int. Cl.
*H04B 1/38*  (2015.01)
*H04L 5/16*  (2006.01)
*H04L 25/02*  (2006.01)
*H04B 3/487*  (2015.01)

(52) U.S. Cl.
CPC ......... *H04L 25/0228* (2013.01); *H04B 3/487* (2015.01)

(58) Field of Classification Search
None
See application file for complete search history.

(56) References Cited

U.S. PATENT DOCUMENTS

| 2005/0152385 A1* | 7/2005 | Cioffi | H04B 3/32 370/420 |
| 2006/0029148 A1 | 2/2006 | Tsatsanis | |
| 2009/0092036 A1* | 4/2009 | Peeters | H04B 3/32 370/201 |
| 2009/0116582 A1 | 5/2009 | Ashikhmin et al. | |
| 2009/0245081 A1 | 10/2009 | Ashikhmin et al. | |
| 2010/0177855 A1 | 7/2010 | Ashikhmin et al. | |
| 2010/0202554 A1* | 8/2010 | Kramer | H04L 25/0224 375/285 |

FOREIGN PATENT DOCUMENTS

| EP | 1936825 A1 | 6/2008 |
| EP | 2136477 A1 | 12/2009 |
| WO | PCTUS2011053434 | 1/2012 |

OTHER PUBLICATIONS

ITU-T Recommendation G.993.2, "Very High Speed Digital Subscriber Line Transceivers 2," Series G: Transmission Systems and Media, Digital Systems and Networks, Feb. 2006, 252 pages.

(Continued)

*Primary Examiner* — Wednel Cadeau
(74) *Attorney, Agent, or Firm* — Ryan, Mason & Lewis, LLP

(57) ABSTRACT

An access node of a communication system is configured to control crosstalk between channels of the system. A set of L distinct and linearly independent pilot signals is generated, with each pilot signal having length n, where n>L such that n–L linearly independent n-tuples are available for use in detection and correction of impulse noise. In an illustrative embodiment, the L pilot signals are mutually orthogonal. The L pilot signals are transmitted over respective ones of the channels, and one or more of the pilot signals as received over their respective channels are processed to detect the presence of impulse noise. A crosstalk estimate corrected for the detected impulse noise is generated and utilized to control crosstalk between two or more of the channels.

21 Claims, 4 Drawing Sheets

(56) References Cited

OTHER PUBLICATIONS

ITU-T Recommendation G.993.5, "Self-FEXT Cancellation (Vectoring) for Use with VDSL2 Transceivers," Series G: Transmission Systems and Media, Digital Systems and Networks, Apr. 2010, 80 pages.
U.S. Appl. No. 12/493,328, filed Jun. 29, 2009 and entitled "Crosstalk Estimation and Power Setting Based on Interpolation in a Multi-Channel Communication System."
G.-H. Im et al., "Performance of a Hybrid Decision Feedback Equalizer Structure for CAP-Based DSL Systems," IEEE Transactions on Signal Processing, Aug. 2001, pp. 1768-1785, vol. 49, No. 8.

* cited by examiner

DETECTION AND CORRECTION OF IMPULSE NOISE IN COMMUNICATION CHANNEL CROSSTALK ESTIMATES

FIELD OF THE INVENTION

The present invention relates generally to communication systems, and more particularly to techniques for mitigating, suppressing or otherwise controlling interference between communication channels in such systems.

BACKGROUND OF THE INVENTION

Multi-channel communication systems are often susceptible to interference between the various channels, also referred to as crosstalk or inter-channel crosstalk. For example, digital subscriber line (DSL) broadband access systems typically employ discrete multi-tone (DMT) modulation over twisted-pair copper wires. One of the major impairments in such systems is crosstalk between multiple subscriber lines within the same binder or across binders. Thus, signals transmitted over one subscriber line may be coupled into other subscriber lines, leading to interference that can degrade the throughput performance of the system. More generally, a given "victim" channel may experience crosstalk from multiple "disturber" channels, again leading to undesirable interference.

Different techniques have been developed to mitigate, suppress or otherwise control crosstalk and to maximize effective throughput, reach and line stability. These techniques are gradually evolving from static or dynamic spectrum management techniques to multi-channel signal coordination.

By way of example, certain of the above-noted techniques allow active cancellation of inter-channel crosstalk through the use of a precoder. In DSL systems, the use of a precoder is contemplated to achieve crosstalk cancellation for downstream communications between a central office (CO) or another type of access node (AN) and customer premises equipment (CPE) units or other types of network terminals (NTs). It is also possible to implement crosstalk control for upstream communications from the NTs to the AN, using so-called post-compensation techniques implemented by a postcoder. Such pre-compensation and post-compensation techniques are also referred to as "vectoring," and include G.vector technology, which was recently standardized in ITU-T Recommendation G.993.5.

One known approach to estimating crosstalk coefficients for downstream or upstream crosstalk cancellation in a DSL system involves transmitting distinct pilot signals over respective subscriber lines between an AN and respective NTs of the system. Error feedback from the NTs based on the transmitted pilot signals is then used to estimate crosstalk. Other known approaches involve perturbation of precoder coefficients and feedback of signal-to-noise ratio (SNR) or other interference information.

Crosstalk estimates are commonly utilized in situations where one or more inactive lines are being activated in a DSL system. The lines that are being activated are referred to as "activating lines" or "joining lines." For example, it may become necessary to activate one or more inactive lines in a synchronization group that already includes multiple active lines, where synchronization in this context refers to alignment in time of the DMT symbols for the different lines. Such activating of an additional line may require that the crosstalk compensation be adjusted accordingly in order to optimize system performance. Exemplary techniques for controlling crosstalk associated with a joining line are disclosed in European Patent Application Publication No. EP 1936825A1, entitled "A Transient Crosstalk Controlling Device," which is incorporated by reference herein. Crosstalk estimates are also used in other situations, e.g., as a means to track changes in crosstalk over time.

In conventional DSL systems, it can be difficult to generate sufficiently accurate crosstalk estimates in the presence of impulse noise. Impulse noise is known to have an adverse impact on data reception, and standardized channel codes, such as Reed-Solomon codes, are typically utilized to alleviate this adverse impact. Nonetheless, impulse noise remains a significant problem in pilot signal aided estimation of crosstalk. For example, even a single impulse occurring during crosstalk estimation can degrade the estimates so severely that there is a significant SNR loss caused when the estimates are used for vectoring. Crosstalk estimates based on error feedback techniques are particularly vulnerable to such impulse noise. Standard error feedback techniques transmit the above-noted distinct pilot signals using sync symbols which occur 16 times per second. If even a single sync symbol is corrupted by impulse noise, the resulting crosstalk estimates may be extremely poor.

SUMMARY OF THE INVENTION

Illustrative embodiments of the invention provide improved techniques for generating crosstalk estimates in the presence of impulse noise.

In one aspect of the invention, an access node of a communication system is configured to control crosstalk between channels of the system. A set of L distinct and linearly independent pilot signals is generated, with each pilot signal having length n, where n>L such that n−L linearly independent n-tuples are available for use in detection and correction of impulse noise. The L pilot signals are transmitted over respective ones of the channels, and one or more of the pilot signals as received over their respective channels are processed to detect the presence of impulse noise. A crosstalk estimate corrected for the detected impulse noise is generated and utilized to control crosstalk between two or more of the channels. The access node may comprise, for example, a DSL access multiplexer of a DSL system.

In an illustrative embodiment, the set of L distinct and linearly independent pilot signals comprises a set of L mutually orthogonal pilot signals, such that n−L orthogonal n-tuples are available for use in detection and correction of impulse noise. Thus, the L linearly independent pilot signals may, but need not, be mutually orthogonal.

Advantageously, the illustrative embodiments provide substantial impulse noise immunity in DSL systems that utilize vectoring. Such impulse noise immunity may be provided in joining, tracking or other crosstalk control applications. The disclosed techniques for detection and correction of impulse noise are simple and efficient, do not cause any significant additional delay in the generation of crosstalk estimates, and can be readily implemented within the structure of existing standards such as G.vector. Simulation results indicate that a considerable improvement in expected estimation error can be achieved by detecting and correcting impulse noise using the disclosed techniques.

These and other features and advantages of the present invention will become more apparent from the accompanying drawings and the following detailed description.

DETAILED DESCRIPTION OF THE INVENTION

The present invention will be illustrated herein in conjunction with exemplary communication systems and associated techniques for crosstalk control in such systems. The crosstalk control may be applied substantially continuously, or in conjunction with activating of subscriber lines or other communication channels in such systems, tracking changes in crosstalk over time, or in other line management applications. It should be understood, however, that the invention is not limited to use with the particular types of communication systems and crosstalk control applications disclosed. The invention can be implemented in a wide variety of other communication systems, and in numerous alternative crosstalk control applications. For example, although illustrated in the context of DSL systems based on DMT modulation, the disclosed techniques can be adapted in a straightforward manner to a variety of other types of wired or wireless communication systems, including cellular systems, multiple-input multiple-output (MIMO) systems, Wi-Fi or WiMax systems, etc. The techniques are thus applicable to other types of orthogonal frequency division multiplexing (OFDM) systems outside of the DSL context, as well as to systems utilizing higher order modulation in the time domain.

Figure 1:
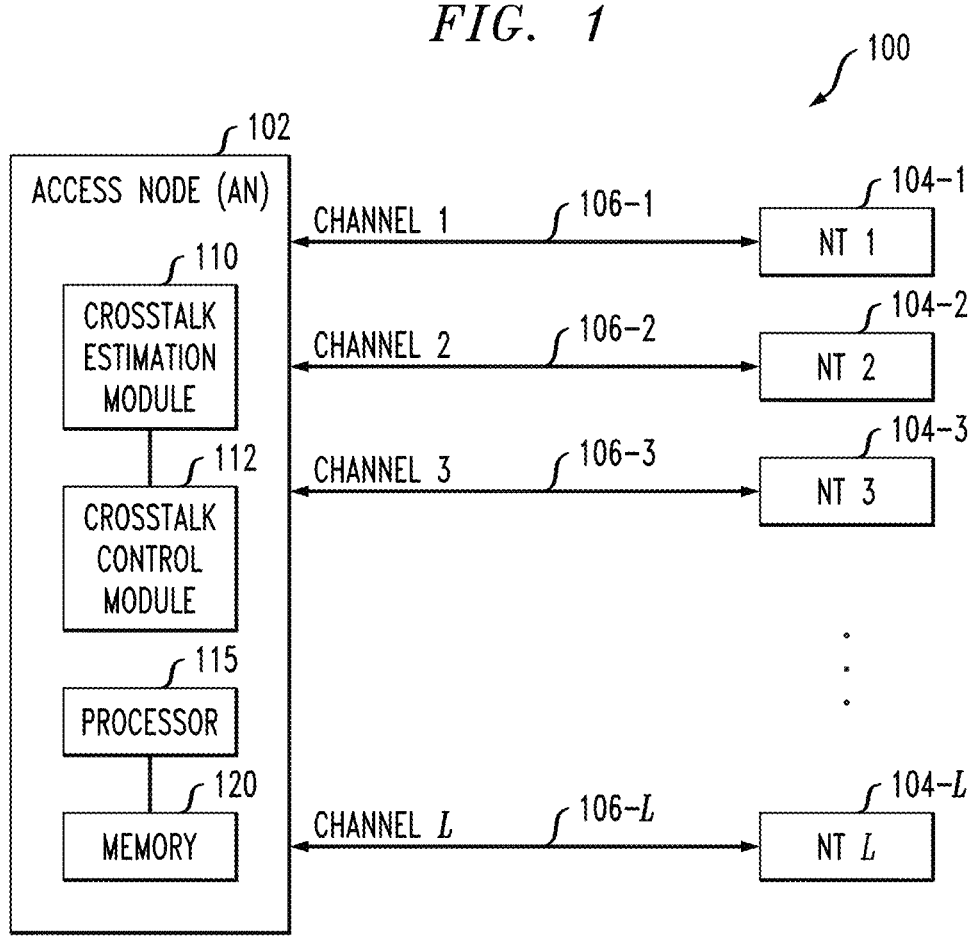
FIG. 1 is a block diagram of a multi-channel communication system in an illustrative embodiment of the invention.

FIG. 1 shows a communication system 100 comprising an access node (AN) 102 and network terminals (NTs) 104. The NTs 104 more particularly comprise L distinct NT elements that are individually denoted NT 1, NT 2, . . . NT L, and are further identified by respective reference numerals 104-1, 104-2, . . . 104-L as shown. A given NT element may comprise, by way of example, a modem, a computer, or other type of communication device, or combinations of such devices. The access node 102 communicates with these NT elements via respective channels 106-1, 106-2, . . . 106-L, also denoted Channel 1, Channel 2, . . . Channel L.

As indicated previously herein, in an embodiment in which system 100 is implemented as a DSL system, the AN 102 may comprise, for example, a central office (CO), and the NTs 104 may comprise, for example, respective instances of customer premises equipment (CPE) units. The channels 106 in such a DSL system comprise respective subscriber lines. Each such subscriber line may comprise, for example, a twisted-pair copper wire connection. The lines may be in the same binder or in adjacent binders, such that crosstalk can arise between the lines. Portions of the description below will assume that the system 100 is a DSL system, but it should be understood that this is by way of example only.

In an illustrative DSL embodiment, fewer than all of the L lines 106-1 through 106-L are initially active lines, and at least one of the L lines is a "joining line" that is to be activated and joined to an existing set of active lines. Such a joining line is also referred to herein as an "activating line." A given set of lines may be, for example, a synchronization group, which may also be referred to as a precoding group or a vectored group, or any other combination of active and/or inactive lines.

Communications between the AN 102 and the NTs 104 include both downstream and upstream communications for each of the active lines. The downstream direction refers to the direction from AN to NT, and the upstream direction is the direction from NT to AN. Although not explicitly shown in FIG. 1, it is assumed without limitation that there is associated with each of the subscriber lines of system 100 an AN transmitter and an NT receiver for use in communicating in the downstream direction, and an NT transmitter and an AN receiver for use in communicating in the upstream direction. A given module combining an AN transmitter and an AN receiver, or an NT transmitter and an NT receiver, is generally referred to herein as a transceiver. The corresponding transceiver circuitry can be implemented in the AN and NTs using well-known conventional techniques, and such techniques will not be described in detail herein.

The AN 102 in the present embodiment comprises a crosstalk estimation module 110 coupled to a crosstalk control module 112. The AN utilizes the crosstalk estimation module to obtain crosstalk estimates for respective ones of at least a subset of the lines 106. The crosstalk control module 112 is used to mitigate, suppress or otherwise control crosstalk between at least a subset of the lines 106 based on the crosstalk estimates. For example, the crosstalk control module may be utilized to provide pre-compensation of downstream signals transmitted from the AN to the NTs, and additionally or alternatively post-compensation of upstream signals transmitted from the NTs to the AN. A more detailed example of a pre-compensation technique implemented in an illustrative embodiment of the invention will be described below in conjunction with FIGS. 3 and 4.

The crosstalk estimation module 110 may be configured to generate crosstalk estimates from error samples, SNR values or other types of measurements generated in the AN 102 based on signals received from the NTs 104, or measurements generated in the NTs 104 and fed back to the AN 102 from the NTs 104. It should be noted that the term SNR as used herein is intended to be broadly construed so as to encompass other similar measures, such as signal-to-interference-plus-noise ratios (SINRs).

In other embodiments, crosstalk estimates may be generated outside of the AN 102 and supplied to the AN for further processing. For example, such estimates may be generated in the NTs 104 and returned to the AN for use in pre-compensation, post-compensation, or other crosstalk control applications. The term "crosstalk estimates" as used herein should be understood to encompass, for example, crosstalk channel coefficients, which may also be referred to crosstalk cancellation coefficients, or simply crosstalk coefficients.

The crosstalk estimation module 110 may incorporate interpolation functionality for generating interpolated crosstalk estimates. Examples of interpolation techniques that may be utilized with the present invention are disclosed in U.S. Patent Application Publication No. 2009/0116582, entitled "Interpolation Method and Apparatus for Increasing Efficiency of Crosstalk Estimation," which is commonly assigned herewith and incorporated by reference herein.

The AN 102 may also or alternatively be configured to implement a technique for channel estimation using linear-model interpolation. In implementing such a technique, the AN transmits the pilot signals over respective ones of the lines 106. Corresponding measurements such as error samples or SNR values are fed back from the NTs to the AN and utilized to generate crosstalk estimates in crosstalk estimation module 110. The AN then performs pre-compensation, post-compensation or otherwise controls crosstalk based on the crosstalk estimates. Additional details regarding these and other similar arrangements are described in U.S. patent application Ser. No. 12/493,328, filed Jun. 29, 2009 and entitled "Crosstalk Estimation and Power Setting Based on Interpolation in a Multi-Channel Communication System," which is commonly assigned herewith and incorporated by reference herein.

The crosstalk estimation module 110 may incorporate denoising functionality for generating denoised crosstalk estimates. Examples of crosstalk estimate denoising techniques suitable for use with embodiments of the invention are described in U.S. Patent Application Publication No. 2010/0177855, entitled "Power Control Using Denoised Crosstalk Estimates in a Multi-Channel Communication System," which is commonly assigned herewith and incorporated by reference herein. It is to be appreciated, however, that the present invention does not require the use of any particular denoising techniques. Illustrative embodiments to be described herein may incorporate denoising functionality using frequency filters as part of a channel coefficient estimation process.

The AN 102 further comprises a processor 115 coupled to a memory 120. The memory may be used to store one or more software programs that are executed by the processor to implement the functionality described herein. For example, functionality associated with crosstalk estimation module 110 and crosstalk control module 112 may be implemented at least in part in the form of such software programs. The memory is an example of what is more generally referred to herein as a computer-readable storage medium that stores executable program code. Other examples of computer-readable storage media may include disks or other types of magnetic or optical media.

It is to be appreciated that the AN 102 as shown in FIG. 1 is just one illustration of an "access node" as that term is used herein. Such an access node may comprise, for example, a DSL access multiplexer (DSLAM). However, the term "access node" as used herein is intended to be broadly construed so as to encompass, for example, a particular element within a CO, such as a DSLAM, or the CO itself, as well as other types of access point elements in systems that do not include a CO.

In the illustrative embodiment of FIG. 1 the lines 106 are all associated with the same AN 102. However, in other embodiments, these lines may be distributed across multiple access nodes. Different ones of such multiple access nodes may be from different vendors. For example, it is well known that in conventional systems, several access nodes of distinct vendors can be connected to the same bundle of DSL lines. Under these and other conditions, the various access nodes may have to interact with one another in order to achieve optimal interference cancellation.

Each of the NTs 104 may be configurable into multiple modes of operation responsive to control signals supplied by the AN 102 over control signal paths, as described in U.S. Patent Application Publication No. 2009/0245081, entitled "Fast Seamless Joining of Channels in a Multi-Channel Communication System," which is commonly assigned herewith and incorporated by reference herein. Such modes of operation may include, for example, a joining mode and a tracking mode. However, this type of multiple mode operation is not a requirement of the present invention.

An implementation of the system 100 of FIG. 1 that is configured to perform at least one of pre-compensation and post-compensation will be described below with reference to FIGS. 2 through 4. More specifically, this implementation includes a precoder providing active crosstalk cancellation for downstream communications from AN 102 to the NTs 104, and may also or alternatively include a postcoder providing active crosstalk cancellation for upstream communications from the NTs 104 to the AN 102. However, the techniques disclosed herein are applicable to systems involving symmetric communications in which there is no particular defined downstream or upstream direction.

Figure 2:
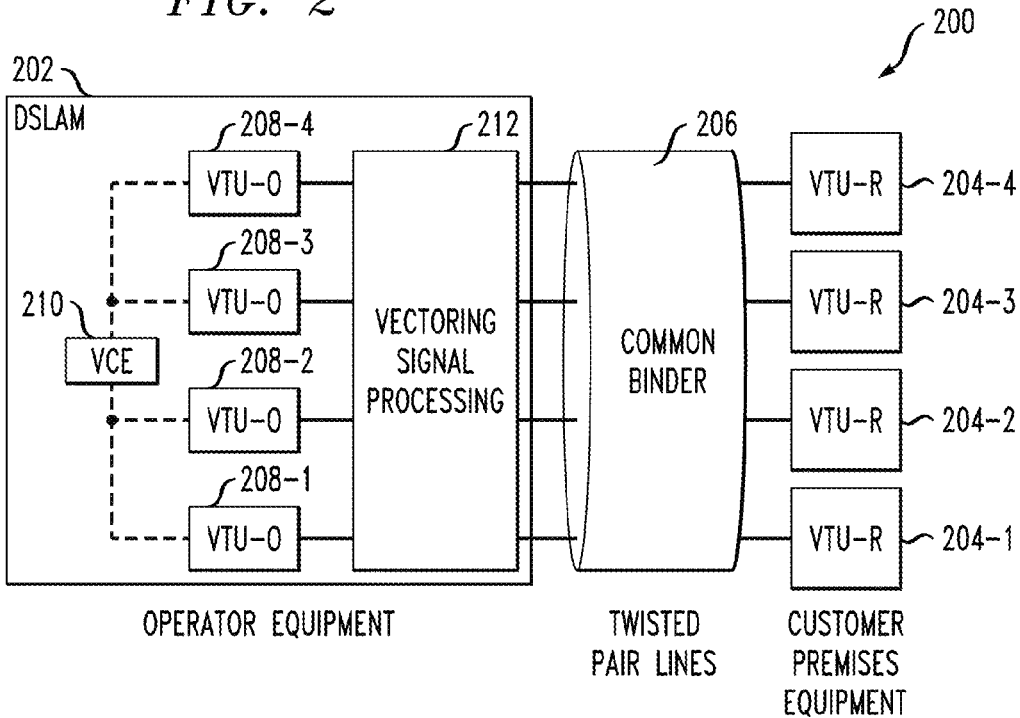
FIG. 2 shows one possible DSL implementation of the FIG. 1 system in an illustrative embodiment.

Referring now to FIG. 2, vectored DSL system 200 represents a possible implementation of the multi-channel communication system 100 previously described. A DSLAM 202 in an operator access node connects to a plurality of CPE units 204 via respective copper twisted pair lines in a binder 206. The CPE units 204 more specifically comprise remote VDSL transceiver units (VTU-Rs) 204-1, 204-2, 204-3 and 204-4. These VTU-Rs communicate with respective operator-side VD SL transceiver units (VTU-Os) 208-1, 208-2, 208-3 and 208-4. The DSLAM 202 further comprises a vector control entity (VCE) 210 and a vectoring signal processing module 212. The VCE 210 and vectoring signal processing module 212 may be viewed as corresponding generally to crosstalk estimation module 110 and crosstalk control module 112 of system 100. Such elements are considered examples of what is more generally referred to herein as "vectoring circuitry."

In the FIG. 2 embodiment, it is assumed without limitation that the VTU-Rs 204 and corresponding VTU-Os 208 operate in a manner compliant with a particular vectoring standard, and more specifically the G.vector standard disclosed in ITU-T Recommendation G.993.5, "Self-FEXT cancellation (vectoring) for use with VDSL2 transceivers," April 2010, which is incorporated by reference herein. It should be noted that use of this particular standard is by way of illustrative example only, and the techniques of the invention can be adapted in a straightforward manner to other types and arrangements of vectoring-compliant AN and NT elements.

The vectoring signal processing unit 212 in DSLAM 202 is configured under control of the VCE 210 to implement pre-compensation for signals transmitted in the downstream direction and post-compensation for signals received in the upstream direction. Effective implementation of these and other crosstalk control techniques requires accurate crosstalk estimates. However, as indicated previously, conventional techniques for generating these crosstalk estimates can be unduly susceptible to impulse noise. Illustrative embodiments of the present invention overcome this problem by providing techniques for generating accurate crosstalk estimates in the presence of impulse noise and other similar degradations.

The term "impulse noise" as used herein is intended to be broadly construed, so as to encompass, for example, impulses or other short bursts of noise that impact only a single tone or a limited number of tones of a given DSL transmission. Various assumptions may be made regarding impulse noise in illustrative embodiments of the invention. For example, it may be assumed that impulses can be treated as being equal in a given tone and at least one tone adjacent to the given tone, or only equal in amplitude for such adjacent tones. As another example, it may be assumed that impulses occur only once during the transmission of a pilot signal, or that multiple impulses affect the same pilot signal. The techniques disclosed herein therefore do not require sophisticated modeling of the impulse noise.

Figure 3:
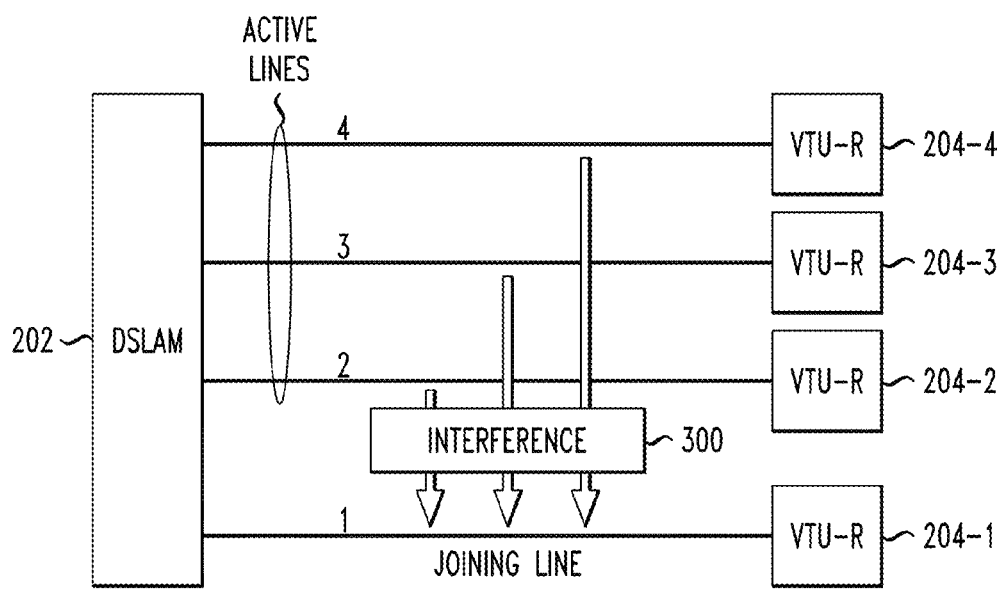
FIG. 3 illustrates interference between multiple active lines and a joining line in the DSL system of FIG. 2.

FIG. 3 shows an example crosstalk scenario that will be used to illustrate the manner in which accurate crosstalk estimates can be generated in the presence of impulse noise in one embodiment of the invention. This particular crosstalk scenario involves lines 1, 2, 3 and 4, associated with VTU-Rs 204-1, 204-2, 204-3 and 204-4, respectively, in system 200 of FIG. 2, where line 1 is a joining line, that is, an inactive line that is transitioning to active status, and lines 2, 3 and 4 are active lines. The VCE 210 in this scenario is configured to generate estimates of crosstalk, denoted by interference 300, from the three active lines 2, 3 and 4 into the joining line 1. In order to generate such estimates with a sufficient level of accuracy in the presence of impulse noise, the VCE 210 is configured to determine the time instances in which impulses occur and to correct for those impulses, in a manner to be described in greater detail below.

It will be assumed, consistent with standard practice in DSL systems, that separate pilot signal components for lines 1-4 of FIG. 3 are transmitted synchronously at the same DSL symbol time. It is a well-known fact that there exist only n mutually orthogonal n-tuples. For example, the following 4-tuples $$v_1=(1,1,1,1), v_2=(1,-1,1,-1), v_3=(1,1,-1,-1), v_4=(1,-1,-1,1)$$

are mutually orthogonal and one can not add another 4-tuple that would be orthogonal to $v_1, \ldots, v_4$. Denote by L the number of DSL lines for which we would like to estimate crosstalk channel coefficients. For this purpose we have to have L distinct pilots. Hence the pilots should be n-tuples with $n \geq L$. We call the parameter n the pilot length. To perform detection and correction of impulse noise in the present embodiment, we incorporate redundancy, that is, we use a value of n that is greater than L. Accordingly, of the n orthogonal n-tuples, L of them are used as pilots, and the remaining n−L are used for detection and correction of impulses, as will be described.

It should be noted that alternative embodiments of the invention may more generally utilize a set of L distinct and linearly independent pilot signals, with each pilot signal having length n, where n>L such that n−L linearly independent n-tuples are available for use in detection and correction of impulse noise. However, for purposes of illustration only, the L linearly independent pilot signals are assumed without limitation to be mutually orthogonal in the description that follows.

Let $A=\{a_1, \ldots, a_L\}$ be a set of L orthogonal pilots of length n>L, where vectors $a_j$ are considered column vectors, and so A is an n×L matrix. Denote by $$h_1 = \begin{pmatrix} h_{1,1} \\ \vdots \\ h_{1,L} \end{pmatrix}$$

the vector of crosstalk coefficients from lines $1, \ldots, L$ to line 1, where $h_{1,1}$ is the direct gain coefficient and in a typical DSL system can be assumed to be known. At the output of line 1 we receive the n×1 vector $$x_1 = Ah_1 + z + s, \quad (1)$$

where z is additive noise and s is a vector of impulse noise. Typically only very few (e.g., one or two) entries of s are not zeros.

For a vector x denote by $x^\dagger$ its Hermitian conjugate, that is $$x = \begin{pmatrix} x_1 \\ \vdots \\ x_n \end{pmatrix}, \quad x^\dagger = (x_1^*, \ldots, x_n^*),$$

where * denotes the operation of complex conjugation. It follows from basic facts of linear algebra that we can find a set $B=\{b_1, \ldots, b_{n-L}\}$ of n−L orthogonal pilots that are also orthogonal to pilots $a_1, \ldots, a_L$, that is $b_j^\dagger a_i = 0$ for all $1 \leq j \leq n-L$ and $1 \leq i \leq L$.

For detection of a nonzero vector s we compute $$y_1 = B^\dagger x_1 = B^\dagger A h_1 + B^\dagger (z+s) = B^\dagger (z+s).$$

Note that $y_1$ does not depend on the crosstalk coefficients $h_1$, but only on the additive noise and possible impulse noise.

We assume that the statistics of additive noise z are known. Using the known statistics of z we apply well-known statistical methods to distinguish between the following two hypotheses:

Hypothesis H0: impulse noise magnitude is smaller than a threshold

Hypothesis H1: impulse noise magnitude is larger than a threshold

For example, using the known statistics of z we can find the value s* that maximizes the likelihood $$\mathcal{L}(y_1 | \|s\| = s^*),$$

and compare s* with the threshold. The value of s* can be found using well-known statistical techniques, such as those disclosed in, for example, S. M. Kay, "Fundamentals of Statistical Signal Processing," Prentice Hall PTR, 1993, and P. J. Bickel and K. A. Doksum, "Mathematical Statistics: Basic Ideas and Selected Topics," Holden Day Series in Statistics, 1977.

As another example, we can find s*, s*=‖s*‖ that maximizes the log likelihood as a function of s*

$$\mathcal{L}(y|s) = -\|y-s\|^2 + C$$

where C is a constant and the statistics of z are $\mathbb{C}N(0,1)$ independently in each component, that is, Gaussian complex random variables with zero mean, unit expected squared magnitude, and independent and identically distributed real and imaginary parts.

If the hypothesis H1 is determined to be correct, then the estimate may be discarded or a request may be made for a retransmission. Correction is also an option but involves determining when the impulses took place, as will be described in detail below. Thus, embodiments of the invention may utilize detection with an option to correct, or detection and identification of the impulse epoch(s). It is generally preferred to correct, at least under the assumption of a single impulse. The disclosed techniques can be used to optionally correct on the basis of estimates of the impulse noise magnitudes using hypothesis testing.

Figure 4:
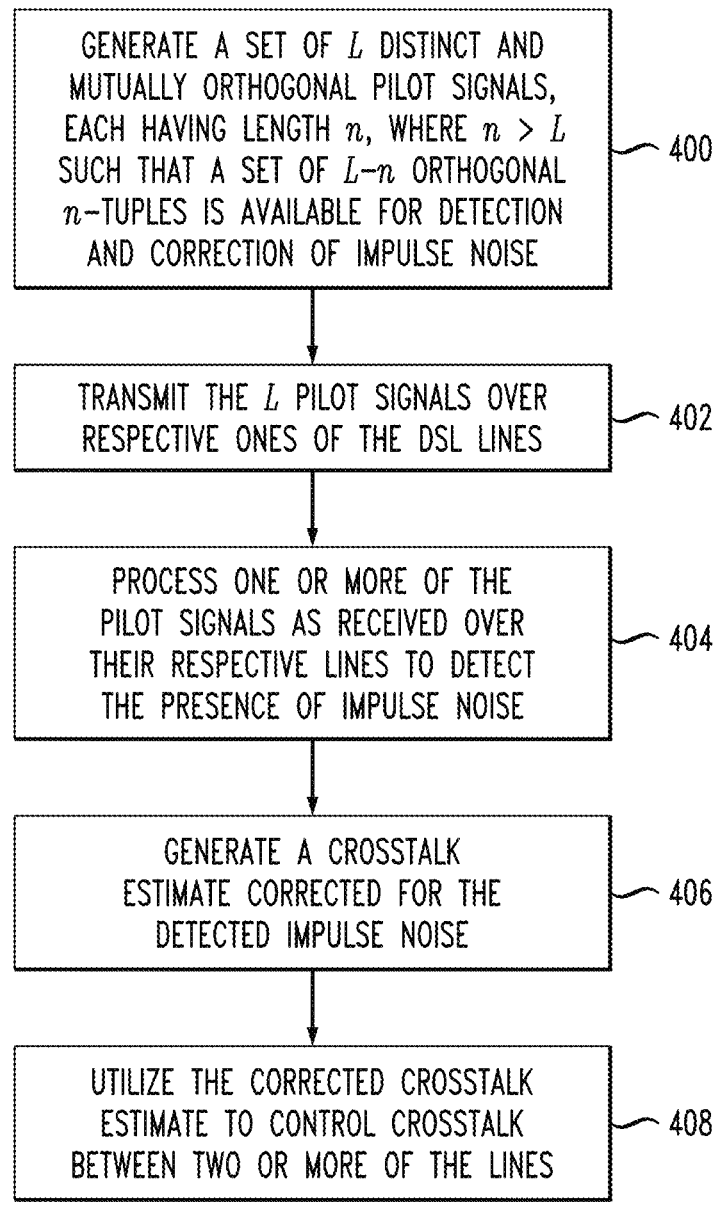
FIG. 4 is a flow diagram showing a crosstalk estimation process using detection and correction of impulse noise in the DSL system of FIG. 2.

FIG. 4 shows a crosstalk estimation process using detection and correction of impulse noise of the type described above. The process includes steps 400 through 408 as shown. In step 400, a set of L distinct and mutually orthogonal pilot signals is generated, each having length n, where n>L such that a set of n−L orthogonal n-tuples is available for detection and correction of impulse noise. The L pilot signals are transmitted over respective ones of the DSL lines, such as lines 1-4 of FIG. 3, in step 402. The pilot signals as received over their respective lines are processed to detect the presence of impulse noise, as indicated in step 404. This processing may occur in the VTU-Rs 204 with the results being fed back to the DSLAM, or may occur in the DSLAM itself. A crosstalk estimate that is corrected for the detected impulse noise is generated in step 406, possibly in the VCE 210 of the DSLAM. The corrected crosstalk estimate is then utilized to control crosstalk between two or more of the channels. For example, the crosstalk estimate may be used in a precoder matrix that is applied by the vectoring signal processing module 212 to signals transmitted by the VTU-Os 208.

It is to be appreciated that the particular process steps in the FIG. 4 diagram are presented by way of illustrative example only, and additional or alternative steps can be used in other embodiments.

A more detailed example based on the FIG. 3 crosstalk arrangement and the FIG. 4 process will now be described. In this example, there are a total of four lines, denoted 1, 2, 3 and 4, associated with respective ones of the VTU-Rs 204, such that L=4. We assume that we expect either no impulses or one impulse, that is, the vector s is either the all-zero vector or it has only one nonzero component. Choose as A the following submatrix of an 8×8 Hadamard matrix, $$A = \begin{bmatrix} 1 & 1 & 1 & 1 \\ -1 & -1 & -1 & -1 \\ 1 & 1 & 1 & -1 \\ -1 & -1 & -1 & 1 \\ 1 & -1 & -1 & -1 \\ -1 & 1 & 1 & 1 \\ 1 & -1 & -1 & 1 \\ -1 & 1 & 1 & -1 \end{bmatrix}.$$

Let us choose $$B = \begin{bmatrix} 1 & 1 & 1 & 1 \\ 1 & 1 & 1 & 1 \\ 1 & -1 & 1 & -1 \\ 1 & -1 & 1 & -1 \\ 1 & 1 & -1 & -1 \\ 1 & 1 & -1 & -1 \\ 1 & -1 & -1 & 1 \\ 1 & -1 & -1 & 1 \end{bmatrix}$$

Note that [AB] is a 8×8 Hadamard matrix. We compute $y_1$ according to Equation (1):

$$y_1 = B^\dagger x_1 = B^\dagger z + B^\dagger s = u + w,$$

where $u = B^\dagger z$ and $w = B^\dagger s$. In a typical communications scenario the entries of z are independent identically distributed (iid) complex Gaussian variables with zero mean and variance V. The rows of $B^\dagger$ are mutually orthogonal and therefore we have that the entries of u are iid complex Gaussian random variables with zero mean and variance nV. Using this fact and well-known statistical techniques we can find the value $w^*$ that maximizes the likelihood $$\mathcal{L}(y_1 \| w \| = w^*).$$

Since we assume that only one impulse occurred during pilot transmission we have $$\|s\|^2 = \|w\|^2/(n-L)$$

and therefore $s^* = \sqrt{w^*/(n-L)}$. Now comparing $s^*$ with the threshold we make a decision whether the impulse noise was sufficiently small or too large for accurate estimation of $h_1$. In the latter case we may request a retransmission of the pilots A.

Note that the described technique does allow one to uniquely identify the time instances at which impulses occurred.

In the following we describe a method for identifying the time instances in which impulses occurred and a method for their correction.

DSL systems generally use orthogonal frequency division multiplexing (OFDM) transmission, and therefore data is transmitted in multiple frequency tones. We assume that pilots are transmitted in tones with indices $f_1, f_2, \ldots, f_K$. For instance, in a typical situation we will have $$f_1 = 1, f_2 = f_1 + \Delta, f_3 = f_1 + 2\Delta, \ldots.$$

We again denote by L the number of DSL lines. We partition the tones in which pilots are transmitted into pairs $(f_1, f_2)$, $(f_3, f_4)$, $(f_5, f_6)$, and so on. We use different sets $A_1$ and $A_2$ of orthogonal pilots of length n>L in the tones from these pairs (e.g., to $A_1$ in the tone $f_1$ and $A_2$ in the tone $f_2$; $A_1$ in the tone $f_3$ and $A_2$ in tone $f_4$, and so on).

For any such $A_1$ and $A_2$ one can find n×(n−L) matrices $B_1$ and $B_2$ with the following properties. The columns of $B_1$ are mutually orthogonal and they are also orthogonal to all columns of $A_1$. Similarly the columns of $B_2$ are mutually orthogonal and they are also orthogonal to all columns of $A_2$.

Without loss of generality we consider below only one pair of tones, say tones $f_1$ and $f_2$. After transmission of pilots $A_1$ and $A_2$ we receive in tones $f_1$ and $f_2$ vectors $$x_1 = A_1 h_1 + z + s, \text{ and } x_2 = A_2 h_2 + w + r,$$

where vectors z and w are additive noise in tones $f_1$ and $f_2$ respectively, and vectors s and r are vectors of impulse noise that affect the tones $f_1$ and $f_2$ respectively.

We compute $$y_1 = B_1^\dagger x_1 = B_1^\dagger A_1 h_1 + B_1^\dagger(z+s) = B_1^\dagger(z+s), \quad (2)$$

and $$y_2 = B_2^\dagger x_2 = B_2^\dagger A_2 h_2 + B_1^\dagger(w+r) = B_2^\dagger(w+r). \quad (3)$$

We then perform the following operations:

1. Use $y_1$ and $y_2$ to identify positions (e.g., time instances), say $j_1, \ldots, j_l$, of impulses.

2. Obtain estimates $\hat{s}_{j_1}, \ldots, \hat{s}_{j_l}$ and $\hat{r}_{j_1}, \ldots, \hat{r}_{j_l}$ of the values of the impulses.

3. Compute the n×1 vector $\hat{x}_1$ from $x_1$ by subtracting the estimates $\hat{s}_{j_1}, \ldots, \hat{s}_{j_l}$ from the corresponding entries of $x_1$.

4. Compute the n×1 vector $\hat{x}_2$ from $x_2$ by subtracting the estimates $\hat{r}_{j_1}, \ldots, \hat{r}_{j_l}$ from the corresponding entries of $x_2$.

5. Use the vectors $\hat{x}_1$ and $\hat{x}_2$ to estimate $h_1$ and $h_2$ using a standard linear regression.

Below we consider one embodiment of the proposed method. In this embodiment we assume that n is a power of 2 and denote by $H_n$ the Hadamard matrix obtained by Sylvester's construction, as described in F. J. MacWilliams and N. J. A. Sloane, "The Theory of Error-Correcting Codes," Horth-Holland, Chapter 2, 1977. For example, if n=8 we have $$H_8 = \begin{bmatrix} 1 & 1 & 1 & 1 & 1 & 1 & 1 & 1 \\ 1 & -1 & 1 & -1 & 1 & -1 & 1 & -1 \\ 1 & 1 & -1 & -1 & 1 & 1 & -1 & -1 \\ 1 & -1 & -1 & 1 & 1 & -1 & -1 & 1 \\ 1 & 1 & 1 & 1 & -1 & -1 & -1 & -1 \\ 1 & -1 & 1 & -1 & -1 & 1 & -1 & 1 \\ 1 & 1 & -1 & -1 & -1 & -1 & 1 & 1 \\ 1 & -1 & -1 & 1 & -1 & 1 & 1 & -1 \end{bmatrix}.$$

We form $A_1$ by the columns of $H_n$ in which odd and even entries have alternating signs and $B_1$ by the columns of $H_n$ whose odd and even entries have the same signs. For instance for n=8 we have $$A_1 = \begin{bmatrix} 1 & 1 & 1 & 1 \\ -1 & -1 & -1 & -1 \\ 1 & -1 & 1 & -1 \\ -1 & 1 & -1 & 1 \\ 1 & 1 & -1 & -1 \\ -1 & -1 & 1 & 1 \\ 1 & -1 & -1 & 1 \\ -1 & 1 & 1 & -1 \end{bmatrix}, B_1 = \begin{bmatrix} 1 & 1 & 1 & 1 \\ 1 & 1 & 1 & 1 \\ 1 & -1 & 1 & -1 \\ 1 & -1 & 1 & -1 \\ 1 & 1 & -1 & -1 \\ 1 & 1 & -1 & -1 \\ 1 & -1 & -1 & 1 \\ 1 & -1 & -1 & 1 \end{bmatrix}.$$

We form $A_2$ and $B_2$ by the cyclic shift of the rows of $A_1$ and $B_1$ respectively. In the case of n=8 we have $$A_2 = \begin{bmatrix} -1 & -1 & -1 & -1 \\ 1 & -1 & 1 & -1 \\ -1 & 1 & -1 & 1 \\ 1 & 1 & -1 & -1 \\ -1 & -1 & 1 & 1 \\ 1 & -1 & -1 & 1 \\ -1 & 1 & 1 & -1 \\ 1 & 1 & 1 & 1 \end{bmatrix}, B_1 = \begin{bmatrix} 1 & 1 & 1 & 1 \\ 1 & -1 & 1 & -1 \\ 1 & -1 & 1 & -1 \\ 1 & 1 & -1 & -1 \\ 1 & 1 & -1 & -1 \\ 1 & -1 & -1 & 1 \\ 1 & -1 & -1 & 1 \\ 1 & 1 & 1 & 1 \end{bmatrix}.$$

Using $A_1$, $B_1$, $A_2$, and $B_2$ we compute $y_1$ and $y_2$ according to Equations (2) and (3) respectively. We further compute vectors $$u = H_{n/2} y_1 \text{ and } g = H_{n/2} y_2.$$

It can be seen that $$u = \begin{pmatrix} z_1 + z_2 + s_1 + s_2 \\ z_3 + z_4 + s_3 + s_4 \\ \vdots \\ z_{n-1} + z_n + s_{n-1} + s_n \end{pmatrix}, \text{ and } g = \begin{pmatrix} w_n + w_1 + r_n + r_1 \\ w_2 + w_3 + r_2 + r_3 \\ \vdots \\ w_{n-2} + w_{n-1} + r_{n-2} + r_{n-1} \end{pmatrix}.$$

In particular, in the case n=8 we have $$u = \begin{pmatrix} z_1 + z_2 + s_1 + s_2 \\ z_3 + z_4 + s_3 + s_4 \\ z_5 + z_6 + s_5 + s_6 \\ z_7 + z_8 + s_7 + s_8 \end{pmatrix}, \text{ and } g = \begin{pmatrix} w_8 + w_1 + r_8 + r_1 \\ w_2 + w_3 + r_2 + r_3 \\ w_4 + w_5 + r_4 + r_5 \\ w_6 + w_7 + r_6 + r_7 \end{pmatrix}.$$

Let us again assume that at most one impulse can occur during transmission of the pilots. We can identify the location of the impulse in the following way. Compute the vector $$q = (|u_1| + |g_1|, |u_1| + |g_2|, |u_2| + |g_2|, |u_2| + |g_3|, \ldots, |u_{n/2}| + |g_{n/2}|, |u_{n/2}| + |g_1|).$$

In the case n=8 we will have $$q = (|u_1| + |g_1|, |u_1| + |g_2|, |u_2| + |g_2|, |u_2| + |g_3|, |u_3| + |g_3|, |u_3| + |g_4|, |u_4| + |g_4|, |u_4| + |g_1|).$$

The largest entry of q indicates the time instance at which the impulse was most likely to have occurred, that is, if $q_j$ is larger than all other entries of q it is mostly likely that the impulse occurred at time instance j. Indeed, if for example the impulse occurred at time instance 1 (that is $|s_1| > 0$ and $|r_1| > 0$ and all other entries of s and r are zeros) then in a typical situation the values $|u_1|$ and $|g_1|$ will be larger then $|u_l|$ and $|g_l|$ for $l \neq 1$. Hence $q_1 = |u_1| + |g_1|$ will be larger than all other entries of q. If the impulse occurred at time instance 2 then typically $|u_1|$ will be larger than $|u_l|$ for $l \neq 1$, and $|g_2|$ will be larger than $|g_l|$ for $l \neq 2$. Hence $q_2 = |u_1| + |g_2|$ will be larger than other entries of q. Similar results are obtained for impulses occurring in the other time instances.

Note that in order to further improve the probability of correct identification of the time instance in which an impulse occurred we compute vectors q, denote them by $q^{(1)}, q^{(2)}, q^{(3)}, \ldots$, for each pair of tones $(f_1, f_2); (f_3, f_4); (f_5, f_6), \ldots$, and further compute $$q = q^{(1)} + q^{(2)} + q^{(3)} + \ldots \quad (4)$$

Then the index of the largest entry of q will again identify the mostly likely time instance at which impulse could occur. Let us assume that, using this procedure, we determined that the impulse occurred at time j. We can estimate the value $s_j$ of the impulse in tone $f_1$ by $u_m$, $m = \lceil j/2 \rceil$. For example, if j=1 we get $\hat{s}_1 = u_1$, and if j=2 we again have $\hat{s}_2 = u_1$.

Similarly we can estimate the value $r_j$ of the impulse in tone $f_2$ by $g_m$, where $m = \lceil j/2 \rceil + (j \mod 2)$ and if we get $m > n/2$ then we replace it by m=1. For example, if j=1 we get $\hat{r}_1 = g_1$ and if j=2 we get $\hat{r}_2 = g_2$.

Now subtracting the estimates $\hat{s}_j$ and $\hat{r}_j$ of the impulses from the corresponding values of $x_1$ and $x_2$ we can further estimate $h_1$ and $h_2$ using standard statistical methods, such as linear regression.

The presence of more than one impulse can be detected by more complex analysis of the vectors u, g, and q. To further improve the detection and correction of multiple impulses we partition pairs $(f_1, f_2), (f_3, f_4), (f_5, f_6)$ into two sets $T_1$ and $T_2$. For example, we can choose $$T_1 = \{f_{(1)}, f_{(2)}, f_{(5)}, f_{(6)}, f_{(9)}, f_{(10)}, \ldots\},$$

and $$T_2 = \{f_{(3)}, f_{(4)}, f_{(7)}, f_{(8)}, f_{(11)}, f_{(12)}, \ldots\}.$$

We use pilots $A_1$, $A_2$ for pairs of tones from $T_1$ and different orthogonal pilots $A_3$, $A_4$ for pairs of tones from $T_2$. We further compute vector q according to Equation (4) for the set $T_1$ and compute a similar vector, say p, for pairs of tones from $T_2$. We then use vectors q and p to identify the locations of possible impulses.

The particular signal processing examples given above should not be construed as limiting in any way, but is instead intended merely to illustrate possible sets of signal processing operations that may be performed in implementing the FIG. 4 process.

Figure 5:
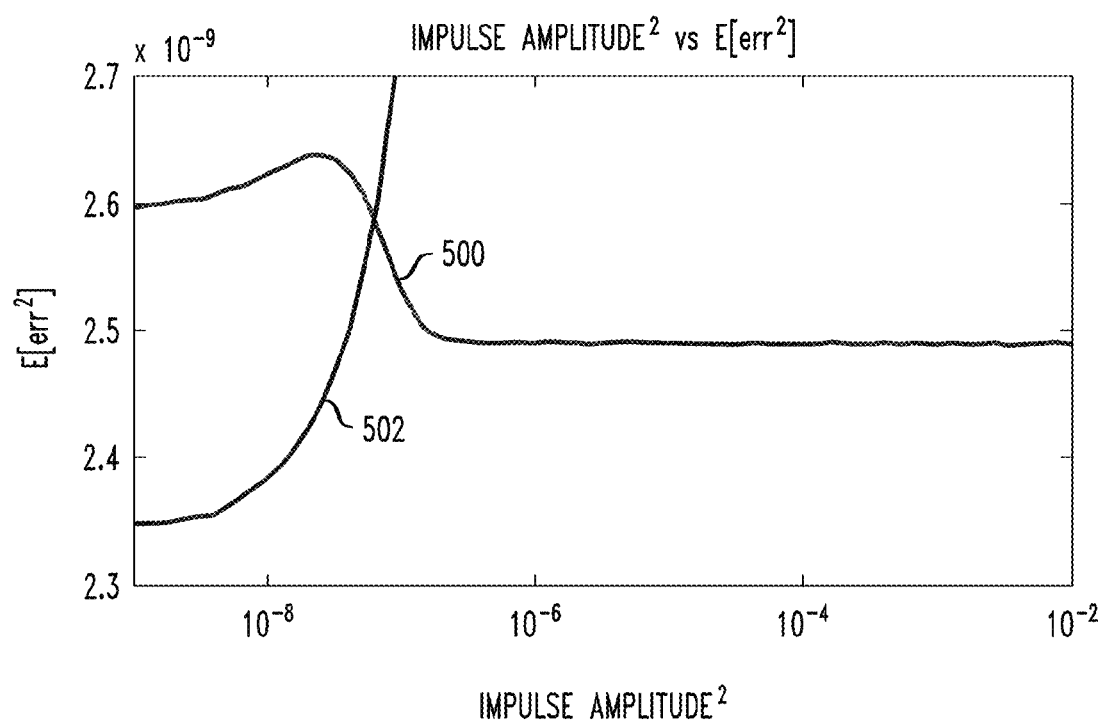
FIG. 5 shows plots of expected estimation error as a function of impulse amplitude, with and without use of the FIG. 4 crosstalk estimation process.

FIG. 5 shows plots of expected estimation error as a function of impulse amplitude squared for simulations of two crosstalk generation techniques, one with and one without impulse noise detection and correction. More specifically, the first plot 500 shows the simulation results with detection and correction of impulse noise using a technique as described in FIG. 4 above, and the second plot 502 shows the simulation results for, a conventional technique without detection and correction of impulse noise. The expected estimation error shown in the plots is given by $$\mathbb{E}(err^2) = \frac{1}{2}(\mathbb{E}(h_1 - \hat{h}_1) + \mathbb{E}(h_2 - \hat{h}_2)),$$

where $\mathbb{E}(\cdot)$ denotes the expected value operator.

As is apparent from plot 500, the expected estimation error $\mathbb{E}(err^2)$ is less than about $2.65 \times 10^{-9}$ for all values of impulse amplitude squared in the range shown. In the simulation used to generate plot 500, only one pair of tones $f_1$ and $f_2$ is used to compute vector q, although it is expected that even better results could be obtained if multiple pairs of tones are used to compute vector q in accordance with Equation (4). We assume for this simulation that one impulse occurred at a random time instance j and that $|s_j|=|r_j|=s$. It is further assumed that the variance of additive noise is var $(z_l)=var(w_l)=10^{-8}$, $l=1, \ldots, n$. No particular assumption is made as to the size of the impulse, but instead performance is determined over all reasonable values.

In the simulation used to generate plot 502, a standard linear regression is used to estimate $h_1$ and $h_2$ without any attempt to detect or correct impulse noise. It can be seen that the expected estimation error in this case increases rapidly for values of impulse amplitude squared above about $10^{-8}$.

The simulation results plotted in FIG. 5 clearly indicate the considerable improvement in expected estimation error that can be achieved by detecting and correcting impulse noise using the techniques disclosed herein.

Advantageously, the illustrative embodiments can provide substantial impulse noise immunity in DSL systems that utilize vectoring. Such impulse noise immunity may be provided in conjunction with the joining of an additional line to a set of active lines, as in the illustrative embodiment of FIG. 3, as well as in other crosstalk control applications, such as during tracking of changes in crosstalk over time. The disclosed techniques for detection and correction of impulse noise are simple and efficient, do not cause any significant additional delay in the generation of crosstalk estimates, and can be readily implemented within the structure of existing standards such as G.vector.

Embodiments of the present invention may be implemented at least in part in the form of one or more software programs that are stored in a memory or other processor-readable medium of AN 102 of system 100. Such programs may be retrieved and executed by a processor in the AN. The processor 115 may be viewed as an example of such a processor. Of course, numerous alternative arrangements of hardware, software or firmware in any combination may be utilized in implementing these and other systems elements in accordance with the invention. For example, embodiments of the present invention may be implemented in a DSL chip or other similar integrated circuit device. Thus, elements such as transceivers 208, VCE 210 and vectoring signal processing module 212 may be collectively implemented on a single integrated circuit, or using multiple integrated circuits. As another example, illustrative embodiments of the invention may be implemented using multiple line cards of a DSLAM or other access node. Examples of access nodes having multiple line card arrangements that can be adapted for use in implementing embodiments of the present invention are disclosed in European Patent Application No. 09290482.0, filed Jun. 24, 2009 and entitled "Joint Signal Processing Across a Plurality of Line Termination Cards." The term "vectoring circuitry" as used herein is intended to be broadly construed so as to encompass integrated circuits, line cards or other types of circuitry utilized in implementing operations associated with crosstalk cancellation in a communication system.

It should again be emphasized that the embodiments described above are presented by way of illustrative example only. Other embodiments may use different communication system configurations, AN and NT configurations, communication channels, crosstalk estimate generation and crosstalk control process steps, depending on the needs of the particular communication application. Also, other types of linearly independent pilot signals may be used in place of the mutually orthogonal pilot signals used in certain of the illustrative embodiments. Alternative embodiments may therefore utilize the techniques described herein in other contexts in which it is desirable to control crosstalk between multiple channels of a communication system.

It should also be understood that the particular assumptions made in the context of describing the illustrative embodiments should not be construed as requirements of the invention. The invention can be implemented in other embodiments in which these particular assumptions do not apply.

These and numerous other alternative embodiments within the scope of the appended claims will be readily apparent to those skilled in the art.

What is claimed is:

1. A method of controlling crosstalk between channels of a communication system, comprising:
   generating a set of L distinct and linearly independent pilot signals, each having length n, where n>L such that n−L linearly independent n-tuples are available for use in detection and correction of impulse noise;
   transmitting the L pilot signals over respective ones of the channels;
   processing one or more of the pilot signals as received over their respective channels to detect the presence of impulse noise;
   generating a crosstalk estimate corrected for the detected impulse noise; and
   utilizing the corrected crosstalk estimate to control crosstalk between two or more of the channels;
   wherein the set of L distinct and linearly independent pilot signals comprises a set of L mutually orthogonal pilot signals, such that n−L orthogonal n-tuples are available for use in detection and correction of impulse noise;
   wherein the set of L mutually orthogonal pilot signals of length n>L is given by an n×L matrix $A=\{a_1, \ldots, a_L\}$ and the received pilot signal for a given one of the channels is given by an n×1 vector $x_1=Ah_1+z+s$, where z is additive noise, s is a vector of impulse noise, and $h_1$ is a vector of crosstalk coefficients; and
   wherein the set of n−L orthogonal n-tuples available for detection and correction of impulse noise is given by an n×(n−L) matrix $B=\{b_1, \ldots, b_{n-L}\}$ where $b_j^\dagger a_i=0$ for all $1 \leq j \leq n-L$ and $1 \leq i \leq n-L$.

2. The method of claim 1 wherein the utilizing step comprises configuring a vectoring signal processing module of an access node of the communication system to control the estimated crosstalk.

3. The method of claim 1 wherein the step of processing one or more of the pilot signals as received over their respective channels to detect the presence of impulse noise further comprises the steps of:
computing a vector $y_1 = \beta^\dagger x_1 = B^\dagger A h_1 + B^\dagger(z+s) = B^\dagger(z+s)$ for the given channel; and
utilizing known statistics of the additive noise z to determine if any entries of the impulse noise vector s are indicative of the presence of impulse noise above a designated threshold.

4. A non-transitory computer-readable storage medium having embodied therein executable program code that when executed by a processor of an access node of the system causes the access node to perform the steps of the method of claim 1.

5. A method of controlling crosstalk between channels of a communication system, comprising:
generating a set of L distinct and linearly independent pilot signals, each having length n, where n>L such that n−L linearly independent n-tuples are available for use in detection and correction of impulse noise;
transmitting the L pilot signals over respective ones of the channels;
processing one or more of the pilot signals as received over their respective channels to detect the presence of impulse noise;
generating a crosstalk estimate corrected for the detected impulse noise; and
utilizing the corrected crosstalk estimate to control crosstalk between two or more of the channels;
wherein the step of processing one or more of the pilot signals as received over their respective channels to detect the presence of impulse noise further comprises the steps of:
partitioning tones in which the pilot signals are transmitted into pairs each including a first tone and a second tone;
using different sets of mutually orthogonal pilot signals of length n>L for respective first and second tones from each of the pairs, with the first and second sets given by matrices given by n×L matrices $A_1$ and $A_2$;
determining n×(n−L) matrices $B_1$ and $B_2$ in which columns of $B_1$ are mutually orthogonal and are also orthogonal to all columns of $A_1$ and in which columns of $B_2$ are mutually orthogonal and are also orthogonal to all columns of $A_2$;
receiving in first and second tones $f_1$ and $f_2$ respective vectors $x_1 = A_1 h_1 + z + s$, and $x_2 = A_2 h_2 + w + r$, where vectors z and w are additive noise in tones $f_1$ and $f_2$ respectively, vectors s and r are vectors of impulse noise that affect the tones $f_1$ and $f_2$ respectively, and $h_1$ and $h_2$ are vectors of crosstalk coefficients;
computing vectors $y_1 = B_1^\dagger x_1 = B_1^\dagger A_1 h_1 + B_1^\dagger(z+s) = B_1^\dagger(z+s)$ and $y_2 = B_2^\dagger x_2 = B_2^\dagger A_2 h_2 + B_1^\dagger(w+r) = B_2^\dagger(w+r)$; and
utilizing known statistics of the additive noise z and w to determine if any entries of the impulse noise vectors s and r are indicative of the presence of impulse noise above a designated threshold.

6. The method of claim 5 wherein the step of utilizing known statistics of the additive noise to determine if any entries of the impulse noise vectors are indicative of the presence of impulse noise further comprises the steps of:
using $y_1$ and $y_2$ to identify time instances $j_1, \ldots, j_l$, of impulses; and
obtaining estimates $\hat{s}_{j_1}, \ldots, \hat{s}_{j_l}$ and $\hat{r}_{j_1}, \ldots, \hat{r}_{j_l}$ of the values of the impulses.

7. The method of claim 5 wherein n is a power of 2 and $H_n$ denotes a Hadamard matrix, and further wherein $A_1$ comprises columns of $H_n$ in which odd and even entries have alternating signs and $B_1$ comprises columns of $H_n$ in which odd and even entries have the same signs.

8. The method of claim 5 wherein $A_2$ and $B_2$ are formed by a cyclic shift of rows of $A_1$ and $B_1$ respectively.

9. The method of claim 5 wherein the step of utilizing known statistics to determine if any entries of the impulse noise vectors are indicative of the presence of impulse noise further comprises the steps of:
computing vectors u and g, where $$u = \begin{pmatrix} z_1 + z_2 + s_1 + s_2 \\ z_3 + z_4 + s_3 + s_4 \\ \vdots \\ z_{n-1} + z_n + s_{n-1} + s_n \end{pmatrix}, \text{ and } g = \begin{pmatrix} w_n + w_1 + r_n + r_1 \\ w_2 + w_3 + r_2 + r_3 \\ \vdots \\ w_{n-2} + w_{n-1} + r_{n-2} + r_{n-1} \end{pmatrix};$$

computing vector q where $$q = (|u_1| + |g_1|, |u_1| + |g_2|, |u_2| + |g_2|, |u_2| + |g_3|, \ldots, |u_{n/2}| + |g_{n/2}|, |u_{n/2}| + |g_1|); \text{ and}$$

identifying a time period in which impulse noise is likely to have occurred by determining which entry of q has a largest value among all entries of q.

10. The method of claim 6 wherein the step of generating a crosstalk estimate corrected for the detected impulse noise comprises:
computing n×1 vector $\hat{x}_1$ from $x_1$ by subtracting the estimates $\hat{s}_{j_1}, \ldots, \hat{s}_{j_l}$ from the corresponding entries of $x_1$;
compute n×1 vector $\hat{x}_2$ from $x_2$ by subtracting the estimates $\hat{r}_{j_1}, \ldots, \hat{r}_{j_l}$ from the corresponding entries of $x_2$; and
using the vectors $\hat{x}_1$ and $\hat{x}_2$ to estimate $h_1$ and $h_2$.

11. The method of claim 9 wherein computing vector q further comprises computing a plurality of vectors $q^{(1)}, q^{(2)}, q^{(3)}, \ldots$, for respective pairs of tones $(f_1, f_2)$, $(f_3, f_4)$, $(f_5, f_6), \ldots$, and further computing $q = q^{(1)} + q^{(2)} + q^{(3)} + \ldots$ to determine the vector q.

12. A method of controlling crosstalk between channels of a communication system, comprising:
generating a set of L distinct and linearly independent pilot signals, each having length n, where n>L such that n−L linearly independent n-tuples are available for use in detection and correction of impulse noise;
transmitting the L pilot signals over respective ones of the channels;
processing one or more of the pilot signals as received over their respective channels to detect the presence of impulse noise;
generating a crosstalk estimate corrected for the detected impulse noise; and
utilizing the corrected crosstalk estimate to control crosstalk between two or more of the channels;
wherein the step of processing one or more of the pilot signals as received over their respective channels to detect the presence of impulse noise further comprises the steps of:
partitioning pairs of tones used to transmit the pilot signals into two sets $T_1$ and $T_2$;
using orthogonal pilot signals given by matrices $A_1, A_2$ for pairs of tones from $T_1$ and different orthogonal pilot signals given by matrices 4, $A_4$ for pairs of tones from $T_2$;

computing a first vector p for the pairs of tones in set $T_1$ and a second vector q for the pairs of tones in set $T_2$; and processing the vectors q and p to identify time periods in which impulse noise is likely to have occurred.

13. An apparatus comprising:
an access node configured to control crosstalk between channels of communication system;
wherein the access node comprises:
  a plurality of transceivers; and
  vectoring circuitry coupled to the transceivers;
  wherein the transceivers are configured under control of the vectoring circuitry to transmit a set of L distinct and linearly independent pilot signals, each of said L pilot signals having length n, where n>L such that n−L linearly independent n-tuples are available for use in detection and correction of impulse noise, the L pilot signals being transmitted over respective ones of the channels;
  wherein one or more of the pilot signals as received over their respective channels are processed to detect the presence of impulse noise;
  the vectoring circuitry being operative to generate a crosstalk estimate corrected for the detected impulse noise and to utilize the corrected crosstalk estimate to control crosstalk between two or more of the channels;
wherein the set of L distinct and linearly independent pilot signals comprises a set of L mutually orthogonal pilot signals, such that n−L orthogonal n-tuples are available for use in detection and correction of impulse noise;
wherein the set of L mutually orthogonal pilot signals of length n>L is given by an n×L matrix $A=\{a_1, \ldots, a_L\}$ and the received pilot signal for a given one of the channels is given by an n×1 vector $x_1=Ah_1+z+s$, where z is additive noise, s is a vector of impulse noise, and $h_1$ is a vector of crosstalk coefficients; and
wherein the set of n−L orthogonal n-tuples available for detection and correction of impulse noise is given by an n×(n−L) matrix $B=\{b_1, \ldots, b_{n-L}\}$ where $b_j^\dagger a_i=0$ for all $1 \leq j \leq n-L$ and $1 \leq i \leq n-L$.

14. The apparatus of claim 13 wherein the access node comprises a DSL access multiplexer.

15. The apparatus of claim 13 wherein the vectoring circuitry comprises a vector control entity operative to generate the corrected crosstalk estimate and a vectoring signal processing module operative to utilize the corrected crosstalk estimate to control crosstalk between two or more of the channels.

16. A communication system comprising the access node of claim 13.

17. The apparatus of claim 15 wherein the access node comprises a processor coupled to a memory, wherein at least one of the vector control entity and the vectoring signal processing module are implemented at least in part in the form of executable program code stored in the memory and executed by the processor.

18. An apparatus comprising:
at least one integrated circuit for use in an access node of a communication system, said at least one integrated circuit comprising:
  a plurality of transceivers; and
  vectoring circuitry coupled to the transceivers;
  wherein the transceivers are configured under control of the vectoring circuitry to transmit a set of L distinct and linearly independent pilot signals, each of said L pilot signals having length n, where n>L such that n−L linearly independent n-tuples are available for use in detection and correction of impulse noise, the L pilot signals being transmitted over respective ones of the channels;
  wherein one or more of the pilot signals as received over their respective channels are processed to detect the presence of impulse noise;
  the vectoring circuitry being operative to generate a crosstalk estimate corrected for the detected impulse noise and to utilize the corrected crosstalk estimate to control crosstalk between two or more of the channels;
wherein the set of L distinct and linearly independent pilot signals comprises a set of L mutually orthogonal pilot signals, such that n−L orthogonal n-tuples are available for use in detection and correction of impulse noise;
wherein the set of L mutually orthogonal pilot signals of length n>L is given by an n×L matrix $A=\{a_1, \ldots, a_L\}$ and the received pilot signal for a given one of the channels is given by an n×1 vector $x_1=Ah_1+z+s$, where z is additive noise, s is a vector of impulse noise, and $h_1$ is a vector of crosstalk coefficients; and
wherein the set of n−L orthogonal n-tuples available for detection and correction of impulse noise is given by an n×(n−L) matrix $B=\{b_1, \ldots, b_{n-L}\}$ where $b_j^\dagger a_i=0$ for all $1 \leq j \leq n-L$ and $1 \leq i \leq n-L$.

19. The apparatus of claim 18 wherein the access node comprises a DSL access multiplexer.

20. The apparatus of claim 18 wherein the vectoring circuitry comprises a vector control entity operative to generate the corrected crosstalk estimate and a vectoring signal processing module operative to utilize the corrected crosstalk estimate to control crosstalk between two or more of the channels.

21. The apparatus of claim 20 wherein the access node comprises a processor coupled to a memory, wherein at least one of the vector control entity and the vectoring signal processing module are implemented at least in part in the form of executable program code stored in the memory and executed by the processor.

* * * * *